United States Patent
Vu Thi et al.

(10) Patent No.: US 12,123,569 B2
(45) Date of Patent: Oct. 22, 2024

(54) ECONOMICAL SURGICAL LIGHTING DEVICE AND METHOD OF ASSEMBLY

(71) Applicant: MAQUET SAS, Orléans (FR)

(72) Inventors: Minh-Hong Vu Thi, Orléans (FR); Jean-Philippe Breton, Orléans (FR); Gregory Senelier, Orléans (FR)

(73) Assignee: MAQUET SAS, Orléans (FR)

( * ) Notice: Subject to any disclaimer, the term of this patent is extended or adjusted under 35 U.S.C. 154(b) by 0 days.

(21) Appl. No.: 18/171,601

(22) Filed: Feb. 20, 2023

(65) Prior Publication Data

US 2023/0288034 A1   Sep. 14, 2023

Related U.S. Application Data

(63) Continuation of application No. PCT/EP2021/072845, filed on Aug. 17, 2021.

(30) Foreign Application Priority Data

Aug. 24, 2020 (FR) ........................... 2008640

(51) Int. Cl.
*F21S 6/00* (2006.01)
*F21V 1/02* (2006.01)
(Continued)

(52) U.S. Cl.
CPC ............ *F21S 6/006* (2013.01); *F21V 1/02* (2013.01); *F21V 5/007* (2013.01); *F21V 5/045* (2013.01);
(Continued)

(58) Field of Classification Search
CPC .. F21S 6/006; F21V 5/007; F21V 5/02; F21V 5/045; F21V 1/02; F21V 9/04; F21V 9/06;
(Continued)

(56) References Cited

U.S. PATENT DOCUMENTS

| 2010/0097803 | A1* | 4/2010 | Wu ..................... | F21V 5/007 362/244 |
| 2012/0081897 | A1* | 4/2012 | Ogawa ................ | G02B 3/08 362/245 |

(Continued)

FOREIGN PATENT DOCUMENTS

CN           102449382 A  *  5/2012  ............. F21K 9/137

OTHER PUBLICATIONS

Hashimoto, N / Endo, T, Lamp and Lighting Device, English translation text with image document CN-102449382-A (Year: 2012).*

*Primary Examiner* — Alan B Cariaso (57) ABSTRACT

This disclosure relates to a surgical lighting device comprising a shell (12), a plurality of light sources (24) coupled to the shell, and a closure plate (18) for closing the lighting device by allowing light to pass through. The closure plate comprises a plurality of lens elements, each lens element being configured to collect and focus light from a corresponding light source to generate a light spot of a predetermined diameter located at a predetermined distance from the lighting device. In order to simplify the structure of the lighting device, the light sources and the cover plate are arranged in such a way that the light beams coming from the light sources and received by the associated lens elements arrive at the lens elements without substantial reflection or deflection. The closure plate therefore comprises all the optics necessary for collecting and focusing the light from the light sources.

17 Claims, 6 Drawing Sheets

(51) Int. Cl.
| | |
|---|---|
| *F21V 5/00* | (2018.01) |
| *F21V 5/02* | (2006.01) |
| *F21V 5/04* | (2006.01) |
| *F21V 9/04* | (2018.01) |
| *F21V 9/06* | (2018.01) |
| *F21W 131/20* | (2006.01) |
| *F21W 131/205* | (2006.01) |
| *F21Y 115/10* | (2016.01) |
| *G02B 3/00* | (2006.01) |

(52) U.S. Cl.
CPC ............... *F21V 9/04* (2013.01); *F21V 9/06* (2013.01); *G02B 3/005* (2013.01); *F21V 5/02* (2013.01); *F21W 2131/20* (2013.01); *F21W 2131/205* (2013.01); *F21Y 2115/10* (2016.08)

(58) Field of Classification Search
CPC ............... G02B 3/005; F21W 2131/20; F21W 2131/205; F21Y 2115/20; F21Y 2105/00
See application file for complete search history.

(56) References Cited

U.S. PATENT DOCUMENTS

| | | | | |
|---|---|---|---|---|
| 2013/0235581 | A1* | 9/2013 | Iatan ................ | B29D 11/00298 362/335 |
| 2013/0258661 | A1* | 10/2013 | Jousse ................ | F21V 33/0068 362/293 |
| 2014/0066722 | A1* | 3/2014 | Marka ................ | F21V 23/0442 600/249 |
| 2015/0153033 | A1* | 6/2015 | Kuo ........................ | F21V 5/007 362/373 |
| 2018/0114886 | A1* | 4/2018 | Liu ..................... | F21V 19/0015 |

* cited by examiner

ECONOMICAL SURGICAL LIGHTING DEVICE AND METHOD OF ASSEMBLY

CROSS-REFERENCE TO RELATED APPLICATIONS

Benefit and priority are claimed to International application PCT/EP2021/072845 (filed Aug. 17, 2021), and French application FR 2008640 (filed Aug. 24, 2020).

TECHNICAL AREA

This disclosure relates to a light-weight and material-efficient surgical lighting device for use in an operating room or other medical setting, and to efficient and economical methods of assembling and manufacturing surgical lighting devices.

BACKGROUND

Surgical lights are generally in the form of a dome that may be suspended from the ceiling of an operating room by an articulated support or mounted on a mobile structure. They may comprise one or more light sources such as LEDs, halogen bulbs or, more rarely, incandescent bulbs. According to the French standard NF EN 6061-2-41 for surgical lights, the surgical light must generate a field of white light at a distance of 1 m from the light emission zone which is characterized by central illumination, a diameter, color rendering index, and a temperature of a specific color to allow optimal viewing conditions for a surgeon. This is usually achieved by using one or more optics to collect the light beams emitted by the light sources and focus them towards the surgical field. The light is then closed by an essentially transparent underside, which may also collect or deflect the light beams further, but also seal the dome of the light in a way that is suitable for a sterile environment.

Figure 1:
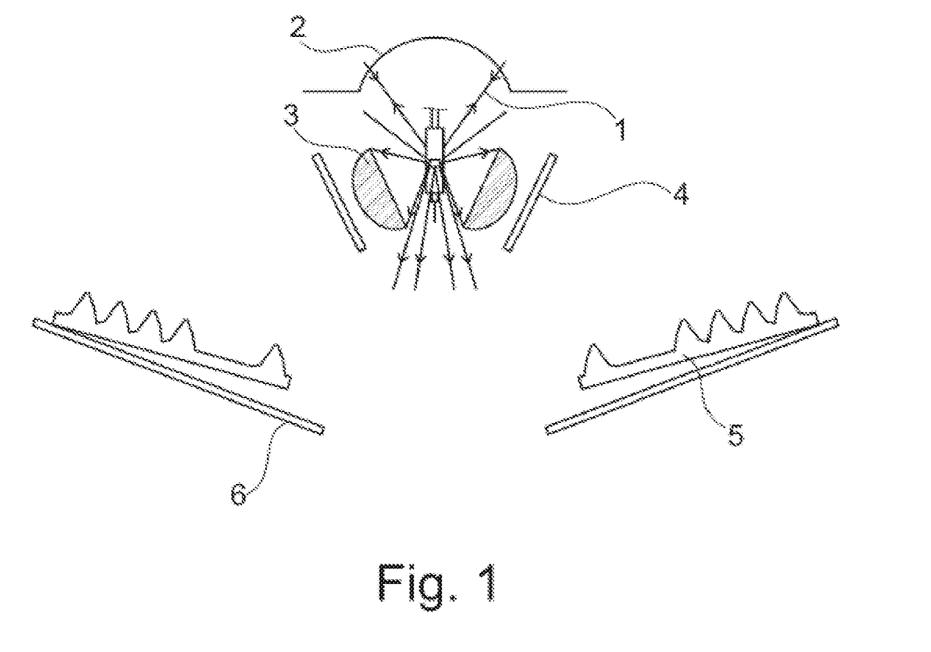
FIG. 1 Schematically illustrates the structure of a surgical lighting device according to the prior art.

The lighting may comprise a single optic or groups of optics including, for example, reflectors, counter-reflectors, lenses, collimators, or the like. FIG. 1 shows the structure of a conventional surgical light. Light source 1 here is a halogen bulb. The light beams from the light source which diverge upwards are collected and reflected downwards by convex reflector 2 arranged above bulb 1. These beams as well as the light beams emitted laterally by the source are collected by condensers 3 and rendered into a parallel or convergent beam. This beam is then directed towards the surgical field through a series of 5 prisms. It may have filters 4, to filter the ultraviolet and infrared light rays from the halogen source. Finally, this optical system is closed with transparent underside 6. Each of these different optics must be correctly positioned and well maintained in place within the lighting. Devices using LEDs as light sources are subject to similar problems, the challenge being exacerbated by the need to provide optics for each LED. For this reason, it is not uncommon for surgical lights to comprise an internal structure for fixing the light sources, any possible printed circuits, and various optics, such as collimators, lenses or reflectors. Lighting is therefore expensive and also complex to assemble and maintain. It also requires careful precision during manufacture to ensure that the various elements are properly aligned.

SUMMARY OF THE DISCLOSURE

The present disclosure aims to alleviate the problems associated with known arrangements and, more specifically, to provide a surgical lighting device with a simplified design making the whole device lighter, more durable, easier to assemble and less expensive.

This and other objectives are achieved in a surgical lighting device comprising a shell and a plurality of light sources coupled to the shell, the device further comprising a closure plate which is at least partially transparent to light and which may be coupled to the shell to close the device by allowing the light from the light sources to pass through. The closure plate comprises a plurality of lens elements thereon, each lens element being configured to collect and focus light from a corresponding light source to generate an illumination spot of a predetermined diameter located at a predetermined distance of the lighting device. The light sources and this closure plate are arranged and aligned such that the light beams coming from the light sources and received by the associated lens elements arrive on the lens elements substantially without reflection or deviation. By avoiding any deflection and reflection before the light from the light sources reaches the optical elements of the closure plate, the arrangement ensures that any optics required to collect and focus the light from the light sources are comprised integrally on or within the closure plate. In other words the device has no optical elements between the light sources and the closure plate. In this way, the device is essentially hollow between the light sources and the closure plate. The overall structure of the lighting device is thus simplified, which facilitates simple and economical assembly and maintenance. As all the optical elements may be fixed to the shell, it is no longer necessary to provide additional mechanical support. This reduces overall weight and increases durability.

Some or all lenses may be a Fresnel lens comprising a central lens area surrounded by a series of raised prisms arranged concentrically on a light entry surface of the closure plate. This structure allows an optimal coupling of the light coming from the light sources with the light spot generated by minimizing the thickness of the plate.

According to a preferred embodiment, the closure plate comprises at least one filter. This may be achieved by surface treatment of the plate to cause a change in the color temperature of light or to block or transmit certain wavelengths for specific medical applications.

Preferably the closure plate has a substantially smooth light exit surface. In this way, cleaning the closure plate of the lighting device is facilitated and the risk of contamination is reduced.

Preferably, the light exit surface of the closure plate is substantially concave in shape. This facilitates the positioning of the light beams emanating from the different light sources and from the optical elements onto the same light point.

The manufacture of the closure plate is facilitated according to a preferred method and embodiment when the closure plate is composed of several parts which are linked together.

Preferably, the closure plate comprises a base plate having an exterior surface that matches the light exit surface of the closure plate and an interior surface with at least one lens element attached to the interior surface of the base plate. Such a structure makes it possible to manufacture the lens elements individually, while minimizing their cost, which greatly facilitates their manufacture and the precision that may be obtained, in particular when the latter are formed by injection molding.

The assembly of the closure plate is even easier when this base plate has a plurality of notches to which the lens elements are fixed.

According to a particularly advantageous embodiment, the closure plate further comprises at least one optical plate placed between some or each of the lens elements and the base plate to diffuse or filter the light. In this way, the lighting device may provide variation in spot diameter or color temperature without the need for additional optics.

According to a preferred embodiment, the thickness of the closure plate in the areas comprising the lens elements is 50 mm at most, preferably 25 mm at most. Furthermore, the distance between the light sources and the closure plate is preferably between 60 mm and 20 mm, and more preferably between 50 mm and 20 mm.

It is preferable that at least one of the lens elements and the closure plate be made of PMMA or PC, or a combination of these two materials.

In a particularly advantageous version, the lighting device comprises LED light sources.

According to another aspect of the present disclosure, a closure plate for closing a surgical lighting device as described above is proposed, which comprises a smooth exterior surface adapted to serve as a light exit surface and an interior surface, wherein a plurality of lens elements are disposed on the inside surface of the plate, each lens element (20) being a Fresnel lens, comprises a central lens area (201) surrounded by a series of raised prisms (202, 203) concentrically disposed on an interior surface of the closure plate (18) and each lens element being configured to collect and focus light from a light source.

Preferably, the closure plate further comprises at least one base plate with at least one lens element attached to the interior surface of the base plate.

In accordance with yet another aspect of this disclosure, a method of manufacturing a light-emitting surface of a surgical lighting device is proposed which comprises the steps of: providing a base plate having a smooth outer surface adapted to serve as a light exit surface and an inner surface, providing a plurality of lens elements adapted to collect and focus light from light sources substantially without reflection or deflection and to fix said lens elements on said top surface of the base plate.

Preferably, the method further comprises the step of inserting an optical plate to diffuse and/or filter light between the lens element and the base plate before bonding the lens element to the base plate. Alternatively, the method may comprise the step of surface treating the closure plate to block the transmission of certain wavelengths.

The closure plate thus fabricated is preferably intended for use in a surgical lighting device as described above.

BRIEF DESCRIPTION OF DRAWINGS

This disclosure will be better understood, and other advantages will appear, upon reading the detailed description of an embodiment presented as a non-limiting example which is illustrated by the appended drawings in which.

DETAILED DESCRIPTION OF THE INVENTION

Figure 2:
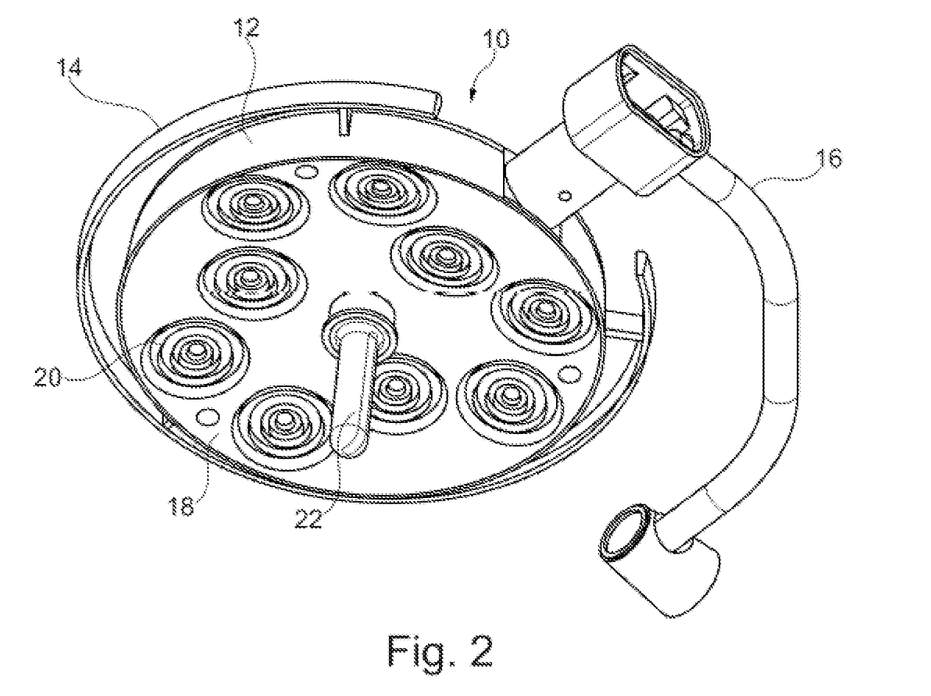
FIG. 2 is a schematic view of a surgical lighting device in accordance with this disclosure.

FIG. 2 shows a surgical lighting device 10 in accordance with this disclosure. The lighting device 10 may be a lamp head, or dome, which may be used alone or in combination with other domes to illuminate a surgical site. The lighting device 10 comprises a housing or shell 12 which, in the example shown, is mounted on an arm 16. This arm 16 may be fixed to an articulated support which is anchored to the ceiling or to the wall of an operating room. The arm may also be mounted on a fixed or mobile support placed on the ground. Shell 12 has a rear surface (not shown) and a continuous side wall extending at an angle to the rear surface.

Handle 14 is fixed to the side wall of shell 12 and extends over part of the periphery thereof. The underside, or light exit surface, of lighting device 10 is capped by closure plate 18 or the underside, which allows light to exit from the lighting device 10 while protecting it from humidity, dust, etc. and allowing thorough cleaning. Another handle 22 extends from shell 12 to the center of the light-emitting surface that makes it possible to manipulate device 10 with one hand.

Figure 3:
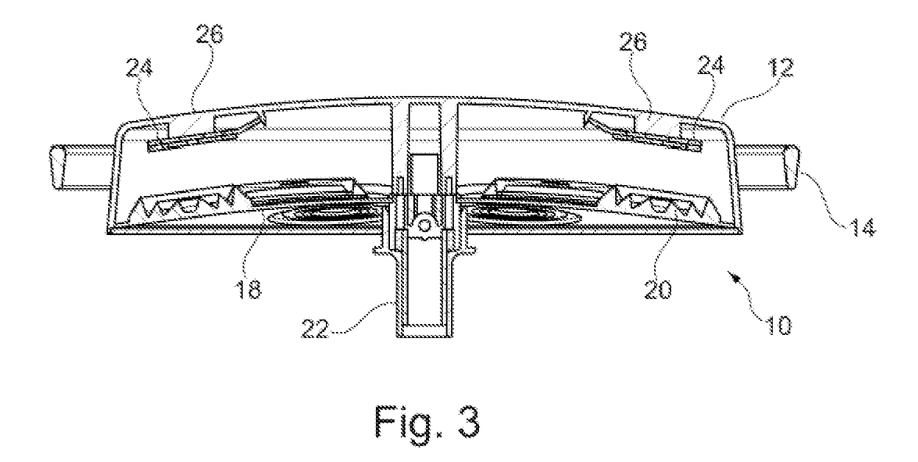
FIG. 3 schematically illustrates the surgical lighting device of FIG. 2 in cross section.

As illustrated in the cross-sectional view of the lighting device 10 shown in FIG. 3, shell 12 defines an interior space between the rear wall and the side wall to accommodate light sources and any associated circuitry, heat sinks or others. Closure plate 18 is provided with several lens elements 20. Preferably each lens element 20 is positioned to collect and focus light from a single corresponding light source 24. For clarity, only two light sources 24 are shown in FIG. 3. They are aligned with a lens element 20 in closure plate 18. In reality, the lighting device 10 will comprise as many light sources 24 as there are lens elements 20, namely nine light sources and lens elements in the device shown in FIG. 1. The light sources 24 illustrated in FIG. 3 are LEDs, preferably of the "chip on board" (COB) type, but other types of LEDs and even other light sources may be used. In the example illustrated, each LED light source 24 is held in place against the interior wall of shell 12 using connectors not shown. Other means of attachment are also possible. Shell 12 may be provided with raised pads 26, as shown in the figure, to position and orient light sources 24, and provide a thermal connection to shell body 12 to facilitate heat dissipation. Closure plate 18 may be fixed to shell 12 by clipping or by screws, for example using the central handle 22 or by fitting connecting pillars. Once attached, the outer edge of closure plate 18 seals the edge of shell 12 against moisture and dust. An additional gasket may be used to improve this seal.

Figure 4:
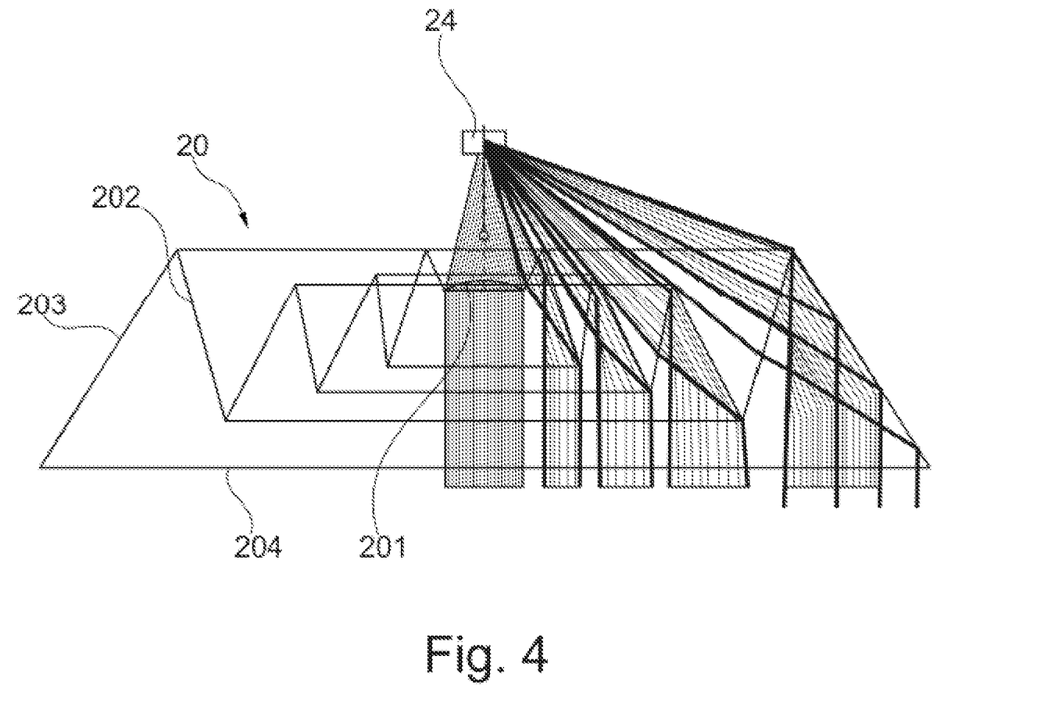
FIG. 4 schematically illustrates the lens element and its function.

FIG. 4 is a sectional view of a lens element 20 according to one embodiment of the lighting device. Lens element 20 is substantially circular in shape with a central area 201 comprising a raised, substantially convex lens. Around this central zone 201, prism structures or teeth are arranged concentrically, each having an entrance surface 202 and a reflection surface 203 arranged at an angle with respect to each other. In the illustrated embodiment, the input faces are planar, but the reflection faces 203 is a complex surface, with a curvature. The input surfaces may also be curved. In the illustrated representation, four prisms or concentric teeth are provided, but it is possible to use more or fewer teeth. The central zone 201 and the teeth 202 are configured to collect different parts of the light beam emitted by the light source. This is shown schematically in the figure. Each part of the emitted beam enters lens element 20 at a different location. Central part of the beam emitted by light source 24 passes through the central zone of lens 201 and is focused towards a designated point at a given distance from the lens. The more divergent sections of emitted light are progressively coupled to one of entry surfaces 202 of the teeth where they are refracted and then reflected off reflecting surface 203 to the same designated point. All beams exit lens element 20 through a common exit surface 204 and are superimposed at the focal point. Exit surface 204 may be flat or slightly concave to better direct light to the designated light spot. This structure, which combines a central lens surrounded by concentric teeth, allows lens element 20 to collect a maximum of rays from light source 24 and focus them on a given focal area with a minimum footprint. Lens elements 20 therefore perform the same function as a combination of lenses, collimators and reflectors present in conventional surgical lighting devices. Lens elements 20 may be, or comprise, a Fresnel lens.

The light-gathering efficiency of each lens element 20 depends to some extent on the thickness of lens element 20 and in particular on the height of the teeth 202, but it is also a function of the diameter of the lens element, the distance between lens element 20, and associated light source 24, and also the size of the light emitting surface of the LED, when used. As regards the thickness of the lenses 20, it is observed that the higher the teeth 202 are, in particular towards the outside of the lens, the more the emitted light beam may be collected. However, this comes at the expense of a smaller light spot diameter. In many configurations of the lighting device 10, the light transmitting areas of closure plate 18, i.e., the areas comprising optical elements 20, will have a maximum thickness of 50 mm or less, and in some configurations, a maximum thickness of 25 mm or less. Regarding the distance between light sources 24 and the highest part of the closure plate 18, some versions have a maximum distance of 60 mm, while others have a maximum distance of 20 mm. The preferred distance is between 20 mm and 50 mm.

It is apparent from the lighting device illustrated in FIG. 3 that by incorporating all the optical elements necessary to collect and focus the light in the closure plate, the overall structure of the lighting device is greatly simplified. All elements may be attached directly to shell 12. It is therefore not necessary to provide intermediate mechanical supports for the various elements. The assembly of the device is therefore also considerably simplified. The overall weight of the equipment may also be reduced significantly. Furthermore, a space is provided between light sources 24 and lens elements 20. In some embodiments this space may remain empty or substantially empty. In other embodiments, this space may be used to insert a diffuser plate to change the diameter of the light spot. For example, diffusion plates could be inserted in front of some of lens elements 20 and the diameter of the light spot could be changed by changing the currents supplied to LED light sources 24. Similarly, a filter plate could be interposed between one or more of light sources 24 and corresponding lens elements 20 in order to vary the color temperature of the light spot or cut off a certain wavelength zone, depending upon the surgeon's needs.

Figure 5:
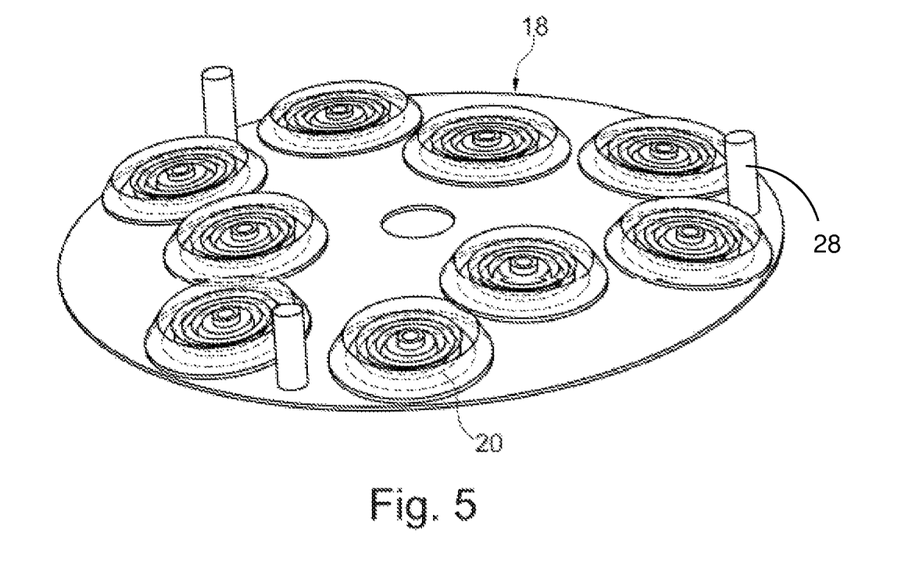
FIG. 5 schematically illustrates a closure plate according to one embodiment.

FIG. 5 illustrates a closure plate 18 according to one embodiment of lighting device 10. Closure plate 18 comprises several lens elements 20 arranged at predefined locations on the surface to correspond to the positions of the light sources 24 in shell 12. The closure plate is made from a substantially transparent material, such as PMMA (polymethyl methacrylate), PC (polycarbonate), silicone or other suitable material. It is preferably manufactured by molding, by injection, and may be formed in one piece. It may also be made of different materials. In some versions, the non-light emitting areas of closure plate 18, i.e., the areas without lens elements 20, may be less transparent or even substantially opaque. This may be achieved by applying a coating. The underside of closure plate 18 shown in the figure will form the outer surface when mounted on the lighting device 1. This side is preferably smooth, which allows it to close impermeably for the lighting device. This surface may also be flat or curved, for example concave. Pillars 28 are provided on the upper surface of closure plate 18 to enable it to be secured to shell 12 by screws or the like. Other attachment means may be provided, such as clips or the like, to attach the closure plate to the edge of the shell or to handle 22

In the example illustrated, shell 12 and closure plate 18 have an essentially circular shape. It will however be appreciated that the inventive arrangement may be applied to lighting devices of various shapes and structures, including those which comprise several shell or housing parts. Accordingly, closure plate 18 may take different shapes or be provided in several parts depending on the shape of the lighting device.

Figure 6:
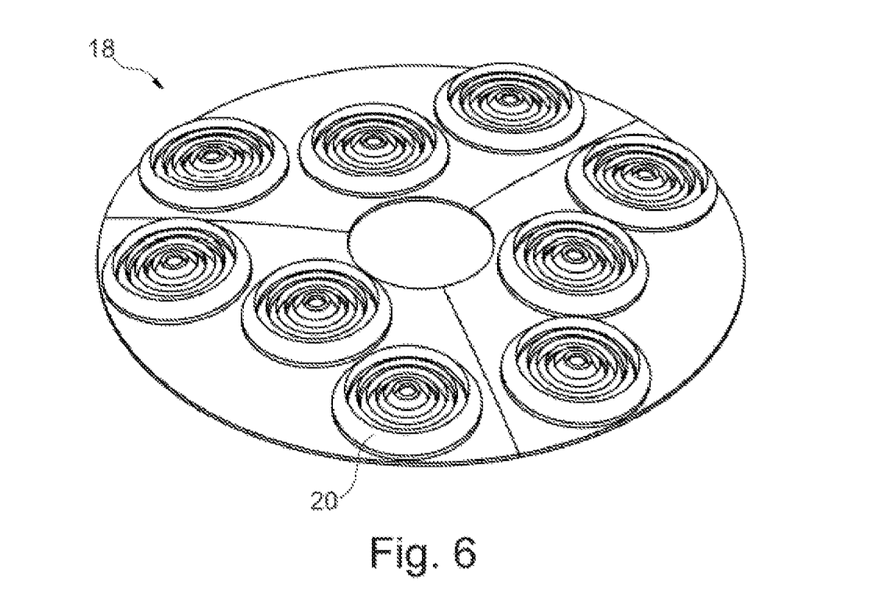
FIG. 6 schematically illustrates a closure plate according to another embodiment.

FIG. 6 shows a closure plate 18 according to another variant. In this arrangement, the closure plate is composed of several parts or sectors 180, three in the example shown, which may then be glued together to ensure water and dust impermeability. Making closure plate 18 in several parts facilitates the injection molding process and thus reduces the cost. At the same time, the precision of the manufacture may be improved, making it possible in particular to obtain a smaller clearance angle on lens elements 20.

Figure 7A:
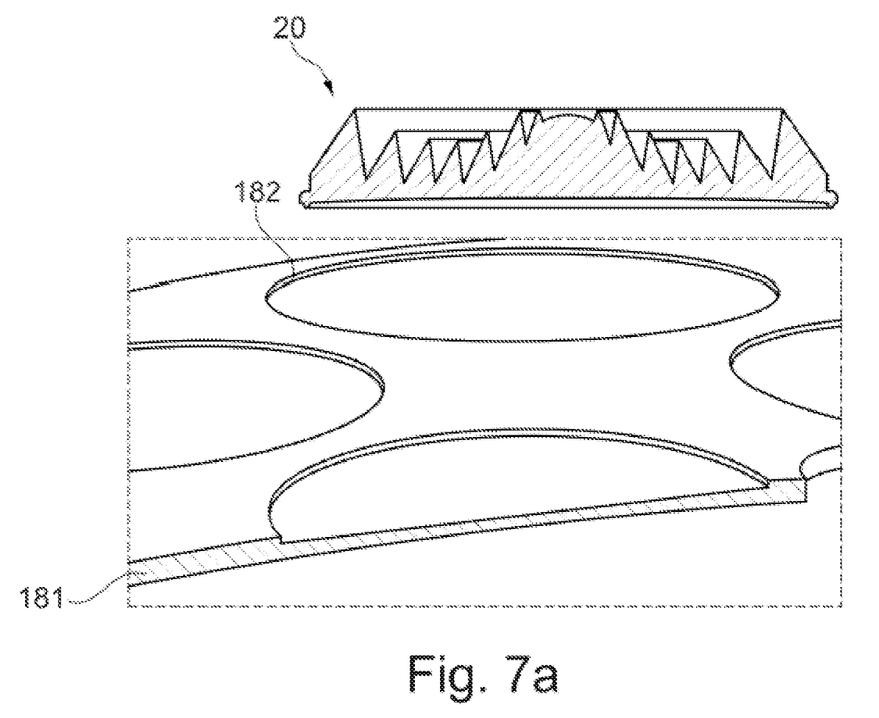
FIG. 7a shows a partially exploded sectional view of a closure plate of the lighting device according to another embodiment.
Figure 7B:
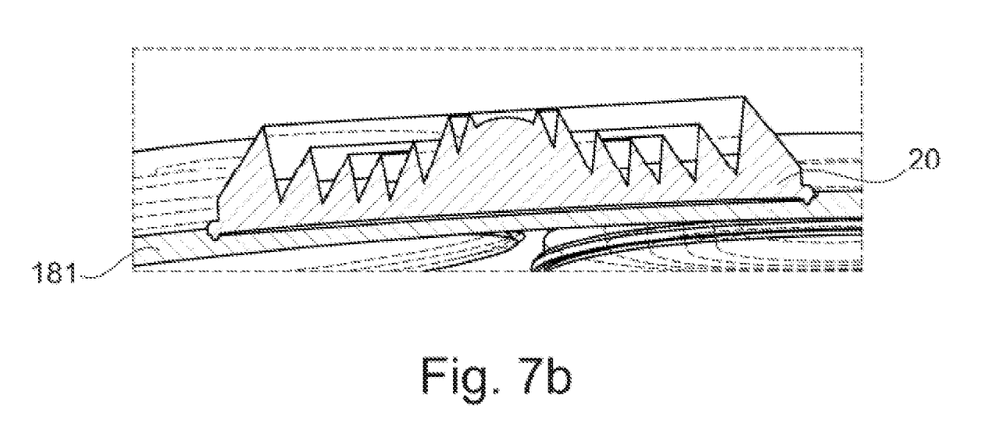
FIG. 7b schematically shows a sectional view of the assembled closure plate of FIG. 7b

FIGS. 7a and 7b illustrate a closure plate 18 according to another embodiment. In this configuration, closure plate 18 is composed of a base plate 181 which has a smooth underside and notches or positions 182 to accommodate the various lens elements 20. Lenses 20 are then attached to base plate 181 by ultrasonic or other similar means. This arrangement has the advantage that the injection molding of the base plate and lens elements 20 may be carried out separately. This makes it possible to obtain smaller prism angles, which improves lens accuracy. Lens elements 20 may be provided with a flat or slightly concave exit surface, as shown in FIG. 7b, without impacting the smooth underside of closure plate 18. Base plate 181 and lens elements 20 may also be made of different materials. For example, lenses 20 may be PMMA while base plate 181 is PC. It is furthermore conceivable that the base plate consists of several parts which are then glued together to form the final structure.

Figure 8:
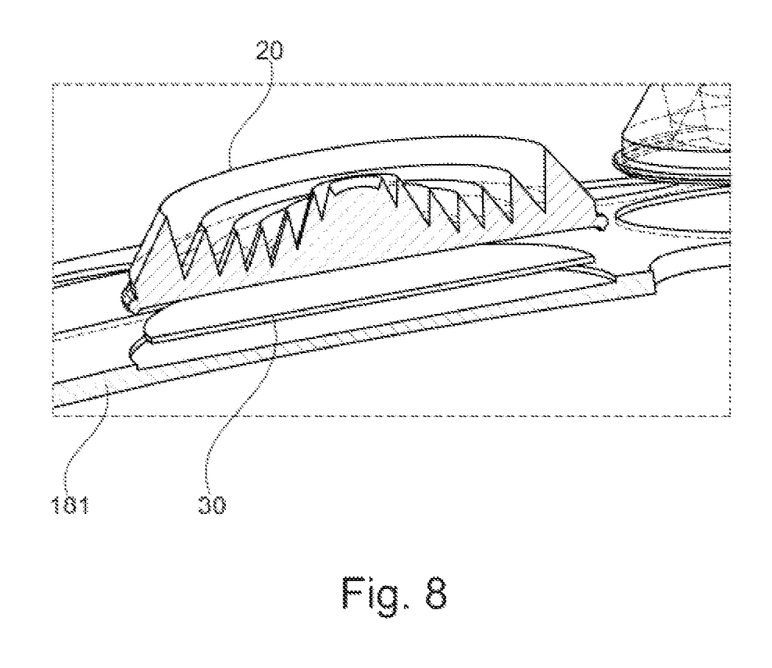
FIG. 8 is a sectional view, partially exploded, of a closure plate according to another embodiment.

The structure consisting of the closure plate shown in FIGS. 7a and 7b may be further modified as shown in FIG. 8. In this arrangement, another optical plate 30 is interposed between lens element 20 and base plate 181. The optical plate 30 may be a diffusion plate to increase the diameter of the light spot generated. The optical plate 30 may also be a filter making it possible to modify the color temperature of the light, or to absorb a band of wavelengths for specific applications. By interposing a diffusion plate or filter 30 between specific individual lens elements 20 and base plate 181 and then allowing the power supply to individual light sources 24 to be controlled, the lighting device may be used to provide different light spot diameters or different light temperatures in an adjustable manner.

In another variant of the device, one or more filters may be incorporated into the closure plate by means of a surface treatment of plate 18 or of one or more of lens elements 20.

This disclosure includes an operative illumination device comprising a shell (12) and a plurality of light sources (24) coupled to the shell, the device further comprising a closure plate (18) that is at least partially light transmissive and that can be coupled to the shell to close the illumination device (10) by passing light from the light sources, the closure plate (18) comprising a plurality of lens elements (20), each lens element (20) being a Fresnel lens, comprising a central lens area (201) surrounded by a series of raised prisms (202, 203) concentrically disposed on an interior surface of the closure plate (18) each lens element being configured to collect and focus light from a corresponding light source (24) to generate a spot of illumination of predetermined diameter located at a predetermined distance from the lighting device the light sources (24) and the closure plate (18) being arranged such that light beams from the light sources received by associated lens elements (20) impinge on the lens elements substantially without reflection or deflection, the device being devoid of optical elements between the light sources (10) and the closure plate (18).

In some embodiments the closure plate (18) comprises at least one filter. In some embodiments the closure plate (18) has a substantially smooth light exit surface. In some embodiments the light exit surface of the closure plate (18) is substantially concave in shape. In some embodiments the closure plate (18) is comprised of a plurality of parts (20; 180; 181, 182) that are bonded together. In some embodiments the closure plate (18) comprises at least one base plate (181) having an outer face that corresponds to the light exit surface of the closure plate and an inner face with at least one lens element (20) attached to the inner face of the base plate (181). In some embodiments the inner face of the base plate (181) includes a plurality of notches (182) to which the lens elements (20) are attached. In some embodiments the closure plate (18) further comprises at least one optical plate (30) disposed between the lens elements (20) and the base plate (181) for diffusing and/or filtering light. In some embodiments thickness of the closure plate in the areas comprising the lens elements (20) is at most 50 mm, preferably at most 25 mm. In some embodiments the distance between the light sources (24) and the closure plate (18) is between 60 mm and 20 mm, preferably between 50 mm and 20 mm. In some embodiments at least one of the lens elements (20) and the closure plate (18) is made of PMMA, PC, silicone, or a combination thereof. In some embodiments the light sources include LED light sources (10). In some embodiments the device is substantially empty between the light sources (10) and the closure plate (18). In some embodiments, all optical elements are included in the closure plate (18).

This disclosure also includes a closure plate for use in an operating light device, the closure plate comprising a smooth outer face adapted to serve as a light exit surface and an inner face, wherein a plurality of lens elements (20) are disposed on the inner face of the plate, each lens element (20) being a Fresnel lens, comprising a central lens area (201) surrounded by a series of raised prisms (202, 203) concentrically disposed on an inner surface of the closure plate (18) and each lens element being configured to collect and focus light from a light source (24). The closure plate could include at least one base plate (181) with at least one lens element (20) attached to the interior surface of the base plate (181). In some embodiments, at least one optical plate (30) is disposed between the lens elements (20) and the base plate (181) for diffusing and/or filtering light.

This disclosure also includes methods of making a closure plate of a lighting device, comprising the steps of: providing a base plate having a smooth outer face adapted to serve as a light exit surface and an inner surface; providing a plurality of lens elements (20) adapted to collect and focus light from light sources substantially without reflection or deflection; and attaching the lens elements (20) to the inner surface of the base plate. The methods may include a step of interposing an optical plate for scattering and/or filtering light between the lens element and the base plate before bonding. The methods may also include adding a closure plate so made to a lighting device.

This disclosure include surgical and medical lighting, similar lighting for other applications, closure plates for such lighting, and methods of operating, assembling, and manufacturing such lighting and closure plates. It will be understood that the elements and examples disclosed herein can be applied as a variety of different embodiments, including all reasonable combinations and sub-combinations.

LIST OF REFERENCE NUMBERS

1 Halogen bulb
2 Convex reflector
3 Condenser lens
4 Filter
5 Prism Diffuser/Deflector
6 Underside
10 Lighting device
12 Shell
14 Handle
16 Arms
18 Closure plate
180 Closure Plate Sectors
181 Base plate
182 Location/notch
20 Lens element
22 Sterile handle
24 Light source
26 Pad
201 Central area of lens element
202 Prism entrance surface
203 Prism reflection surface
204 Lens element exit surface
28 Pillars
30 Optical plate

The invention claimed is:

1. A surgical lighting device comprising:
a shell, and a plurality of light sources coupled to the shell,
a closure plate which is at least partially transparent to light, and which is coupled to the shell to substantially close off an internal area of the surgical lighting device, the closure plate being configured for passing light from the light sources,
the closure plate comprising a base plate and a plurality of lens elements, each lens element comprising a Fresnel lens, the Fresnel lenses each comprising a central lens area surrounded by a series of raised teeth concentrically disposed on an interior surface of the closure plate, each lens element being configured to collect and focus light from at least one light source to generate an illumination spot, wherein the base plate comprises a plurality of notches corresponding to a shape of a respective lens element, the notches being oriented towards the internal area of the lighting device, and wherein the lenses are each attached in corresponding notches on the base plate;

the light sources and the closure plate being arranged such that light from the light sources reaches and enters the lens elements substantially without prior reflection or deflection, the device being free of optical elements between the light sources (10) and the closure plate; and wherein a substantially empty space is provided between the light sources and the plurality of lens elements.

2. A method of assembling the lighting device according to claim 1, the method comprising the steps of:

providing the base plate, the base plate having a smooth outer face adapted to serve as a light exit surface, and an inner surface opposite the outer surface and having said notches;

providing the plurality of lens elements;

positioning the lens elements at corresponding notches, and bonding the lens elements at the corresponding notches of the base plate to form the closure plate;

and then attaching the closure plate to the shell.

3. A surgical lighting device comprising:

a shell, and a plurality of light sources coupled to the shell, the device further comprising a closure plate which is at least partially transparent to light and which is coupled to the shell to close off an internal area of the surgical lighting device, the closure plate being configured for passing light from the light sources, the closure plate comprising a plurality of lens elements, each lens element comprising a Fresnel lens, the Fresnel lenses each comprising a series of raised teeth concentrically disposed on an interior surface of the closure plate, each lens element being configured to collect and focus light from at least one light source to generate an illumination spot of a predetermined diameter located at a predetermined distance from the lighting device, the light sources and the closure plate being arranged such that light from the light sources and received by associated lens elements impinge on the lens elements substantially without prior reflection or deflection, the device being free of optical elements between the light sources and the closure plate, wherein the closure plate comprises at least one base plate having an outer face that corresponds to the light exit surface of the closure plate and an inner face with at least one lens element attached to the inner face of the base plate, and wherein the closure plate comprises at least one optical plate disposed between the lens elements and the base plate for diffusing and/or filtering light.

4. The surgical lighting device of claim 3, wherein the closure plate comprises at least one filter.

5. The surgical lighting device according to claim 3, wherein the closure plate has a substantially smooth light exit surface.

6. The surgical lighting device according to claim 3, wherein the light exit surface of the closure plate is substantially concave in shape.

7. The surgical lighting device according to claim 3, wherein the closure plate is comprised of a plurality of parts that are bonded together.

8. The surgical lighting device of claim 3, wherein the inner face of the base plate includes a plurality of notches to which the lens elements are attached.

9. The surgical lighting device according to claim 3, wherein the thickness of the closure plate in the areas comprising the lens elements is at most 50 mm.

10. The surgical light device according to claim 3, wherein the distance between the light sources and the closure plate is between 60 mm and 20 mm.

11. A surgical lighting device according to claim 3, wherein at least one of the lens elements and the closure plate is made of PMMA, PC, silicone, or a combination thereof.

12. A surgical lighting device according to claim 3, wherein the plurality of light sources comprises LED light sources.

13. A surgical lighting device according to claim 3, wherein a substantially empty space is provided between the light sources and the plurality of lens elements.

14. A method of manufacturing the lighting device according to claim 3, the method comprising the steps of:

providing the base plate wherein the outer face is smooth and is adapted to serve as the light exit surface;

providing the plurality of lens elements;

bonding the lens elements to the inner surface of the base plate; and attaching the base plate to the shell to provide at least part of the closure plate of the surgical lighting device.

15. The method according to claim 14, further comprising a step of interposing the optical plate for scattering and/or filtering light between the lens element and the base plate before said bonding.

16. The method according to claim 14:

wherein the inner face of the base plate includes a plurality of notches; and wherein said bonding the lens elements to the inner surface of the base plate comprises placing and attaching the lens elements within the notches.

17. The method according to claim 14:

wherein the inner face of the base plate includes a plurality of notches, wherein the notches have the shape of an outer perimeter of corresponding lens elements; and wherein said bonding the lens elements to the inner surface of the base plate comprises placing and attaching the lens elements within the notches.

* * * * *